(12) United States Patent
Ouyang et al.

(10) Patent No.: US 9,813,461 B2
(45) Date of Patent: Nov. 7, 2017

(54) VIEWING FULL SCREEN APPLICATIONS IN A SHARING SESSION

(71) Applicant: Cisco Technology, Inc., San Jose, CA (US)

(72) Inventors: Hua Ouyang, Jiangsu (CN); Yi Lu, Jiangsu (CN); Qi Shi, Jiangsu (CN); Huahua Yin, Jiangsu (CN); Yunwei Luo, Jiangsu (CN)

(73) Assignee: Cisco Technology, Inc., San Jose, CA (US)

( * ) Notice: Subject to any disclaimer, the term of this patent is extended or adjusted under 35 U.S.C. 154(b) by 352 days.

(21) Appl. No.: 14/083,507

(22) Filed: Nov. 19, 2013

(65) Prior Publication Data

US 2015/0128069 A1  May 7, 2015

(30) Foreign Application Priority Data

Nov. 4, 2013  (CN) .......................... 2013 1 0535584

(51) Int. Cl.
*H04L 29/06* (2006.01)
*H04L 12/02* (2006.01)

(52) U.S. Cl.
CPC .......... *H04L 65/403* (2013.01); *H04L 65/605* (2013.01); *G09G 2340/04* (2013.01); *H04L 12/02* (2013.01)

(58) Field of Classification Search
CPC ............. H04L 12/1822; H04L 12/1813; H04L 29/06421; H04L 12/581; H04L 7/15;

(Continued)

(56) References Cited

U.S. PATENT DOCUMENTS 5,758,110 A * 5/1998 Boss ..................... G06F 3/0481
                                                            715/204
5,867,156 A * 2/1999 Beard ................... G06F 3/0481
                                                            715/753

(Continued)

OTHER PUBLICATIONS

Freedom Scientific, Inc., MAGic® Quick Start Guide, retrieved from http://www.freedomscientific.com/products/low-vision/MAGic-screen-magnification-software.asp, on Aug. 19, 2013, 38 pages.

(Continued)

*Primary Examiner* — Doon Chow
*Assistant Examiner* — Le Nguyen
(74) *Attorney, Agent, or Firm* — Edell, Shapiro & Finnan, LLC

(57) ABSTRACT

An attendee device in an online conference session views a shared application window in a full screen mode. The attendee device receives data for content being shared by a host device, including at least one application window at a first resolution. The attendee device receives an input to enter a full screen mode for one of the application windows and determines whether displaying that application window at a second resolution for the full screen mode requires the image data to be magnified. When displaying the application window at the second resolution requires magnified image data, the attendee device requests the magnified image data from the meeting server facilitating the conference session. The meeting server provides the magnified image data to the attendee device, and the attendee device displays the application window in full screen mode using the magnified image data.

25 Claims, 19 Drawing Sheets

(58) Field of Classification Search
CPC ...... G06Q 10/10; G06F 3/04892; H04N 7/15; G09G 2340/0407; F09G 2340/0407
USPC ........................................ 715/751, 753, 800
See application file for complete search history.

(56) References Cited

U.S. PATENT DOCUMENTS

| | | | | |
|---|---|---|---|---|
| 5,874,960 | A * | 2/1999 | Mairs | G09G 5/14 345/2.2 |
| 6,570,590 | B1 * | 5/2003 | Dubrow | G06F 3/038 715/748 |
| 6,924,822 | B2 | 8/2005 | Card et al. | |
| 8,185,828 | B2 | 5/2012 | Liu et al. | |
| 8,214,747 | B1 * | 7/2012 | Yankovich | G06F 9/4451 715/751 |
| 9,443,441 | B1 * | 9/2016 | Scott | G09B 5/00 |
| 2003/0220973 | A1 | 11/2003 | Zhu et al. | |
| 2005/0091571 | A1 * | 4/2005 | Leichtling | G06F 3/1454 715/203 |
| 2006/0168532 | A1 * | 7/2006 | Stevens | G06Q 10/06 715/753 |
| 2007/0006093 | A1 * | 1/2007 | Day | G06F 9/4443 715/781 |
| 2008/0073936 | A1 * | 3/2008 | Jeng | G06F 3/0481 296/180.1 |
| 2009/0307428 | A1 * | 12/2009 | Schmieder | G06F 3/1462 711/118 |
| 2009/0328033 | A1 * | 12/2009 | Kohavi | G06F 9/5027 718/1 |
| 2010/0037151 | A1 * | 2/2010 | Ackerman | G06Q 10/10 715/753 |
| 2010/0279266 | A1 * | 11/2010 | Laine | G06Q 10/10 434/350 |
| 2011/0246212 | A1 * | 10/2011 | Barnes | G06Q 10/10 705/1.1 |
| 2011/0310216 | A1 * | 12/2011 | Lee | H04N 7/15 348/14.08 |
| 2012/0324365 | A1 * | 12/2012 | Momchilov | G06F 3/14 715/738 |
| 2013/0031481 | A1 * | 1/2013 | Schreifels | G06F 9/4445 715/740 |
| 2013/0123019 | A1 * | 5/2013 | Sullivan | A63F 13/12 463/42 |
| 2013/0301953 | A1 * | 11/2013 | Montague | G06Q 30/0241 382/276 |
| 2014/0096013 | A1 * | 4/2014 | Grosz | G06F 3/0484 715/733 |
| 2014/0325372 | A1 * | 10/2014 | Spracklen | G06F 3/14 715/740 |

OTHER PUBLICATIONS

Freedom Scientific, Inc., MAGic® Screen Magnification Software Flyer, retrieved from http://www.freedomscientific.com/products/low-vision/MAGic-screen-magnification-software.asp, on Aug. 19, 2013, 2 pages
Cisco, "Controlling Your Personal Cisco Unified MeetingPlace Express Meeting Experience," Chapter 6, User Guide for Cisco Unified MeetingPlace Express Release 2.x, ©2008 Cisco Systems, Inc., retrieved from: http://www.cisco.com/en/US/docs/voice_ip_comm/meetingplace_express/2_0/english/user/guide/ctrlpers.pdf, on Nov. 18, 2013, 8 pages.
TeamViewer GmbH, "TeamViewer 7 Manual Meeting," retrieved from: http://www.teamviewer.com/en/res/pdf/TeamViewer7_Manual_Meeting_EN.pdf, on Nov. 18, 2013, 60 pages.
Privat, "Using the Full Screen function in Acrobat Connect Pro Meetings," Adobe Connect User Community, Aug. 2008, Printed From: http://www.connectusers.com/tutorials/2008/08/using_fullscreen/index.php, on Nov. 15, 2013, 10 pages.
Behera, et al., "Looking at projected documents: Event detection & document identification," IEEE International Conference on Multimedia and Expo (ICME), Jun. 2004, pp. 1-4.
PrecisionIR Group, "IR Webcast Options," PrecisionIR.com, 2010, pp. 1-3.
Macromedia, Breeze Meeting User Guide for Meeting Hosts and Presenters, retrieved from http://download.macromedia.com/pub/documentation/en/breeze/5/meeting_ug_presenters.pdf, on Aug. 20, 2013, 130 pages.
Nathan, et al., "In Case You Missed It: Benefits of Attendee-Shared Annotations for Non-Attendees of Remote Meetings," CSCW'12, Feb. 11-15, 2012, Seattle, Washington, USA, pp. 1-10.

* cited by examiner

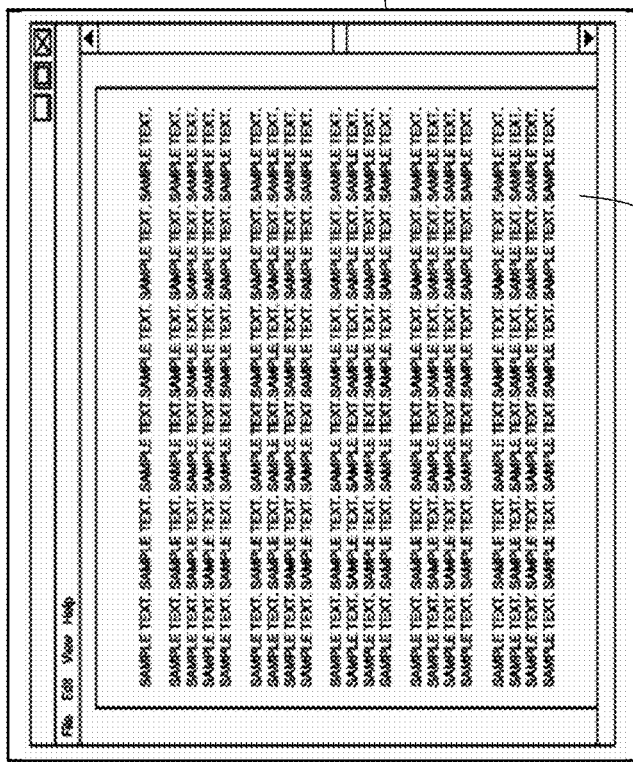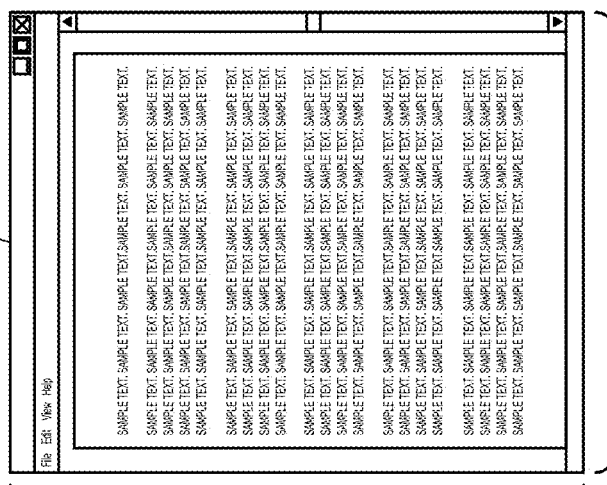
FIG.3C

VIEWING FULL SCREEN APPLICATIONS IN A SHARING SESSION

CLAIM TO FOREIGN PRIORITY

This application claims priority to Chinese Application No. 201310535584.8, filed Nov. 4, 2013, entitled "Viewing Full Screen Applications in a Sharing Session," the entirety of which is incorporated herein by reference.

TECHNICAL FIELD

The present disclosure relates to sharing of content in an online conference session.

BACKGROUND

In online/web-based meetings involving desktop sharing, documents or materials displayed on a presenter's device can be shared with a plurality of meeting attendees by simultaneously displaying the same materials on the attendees' devices. With increasing diversity of devices used to participate in online meetings, a larger disparity in display size and resolution needs to be supported. Users with mobile devices with small displays may encounter a poor user experience when viewing the shared content of a user with a larger display.

BRIEF DESCRIPTION OF THE DRAWINGS

FIGS. 3A-3C show examples of an attendee device scaling an application to be displayed in the full screen mode.

DESCRIPTION OF EXAMPLE EMBODIMENTS

Overview

Presented herein are techniques to enable an attendee device in an online conference session to view a shared application window in a full screen mode. The attendee device receives data for content being shared by a host device, including at least one application window at a first resolution. The attendee device receives an input to enter a full screen mode for one of the application windows and determines whether displaying that application window at a second resolution for the full screen mode requires the image data to be magnified. The meeting server provides the magnified image data to the attendee device, and the attendee device displays the application window in full screen mode using the magnified image data.

Example Embodiments

Figure 1A:
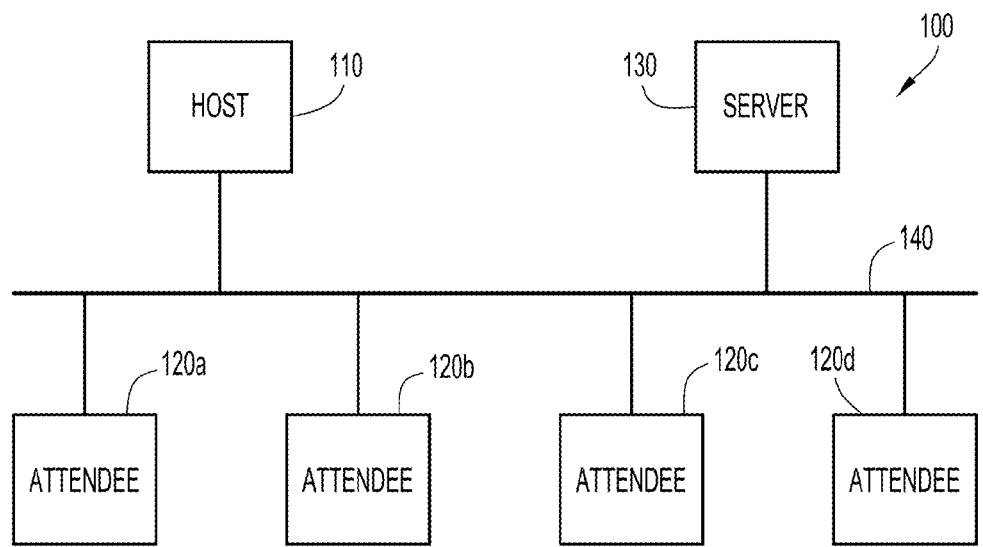
FIG. 1A is a block diagram of an online conference system capable of supporting an online/web-based conference session during which content may be shared according to the techniques presented herein.

Referring to FIG. 1A, an online conference system 100 is shown that enables host device 110 to share documents and information with attendee devices 120a-120d through meeting server 130 across network 140. Only four attendee devices are shown in FIG. 1, but any number of attendee devices may be included in system 100. Host device 110 and attendee devices 120a-120d may take a variety of forms, including a desktop computer, laptop computer, mobile/cellular phone, tablet computer, etc. Network 140 may be any type of network (e.g., any combination of Internet, intranet, local area network (LAN), wide area network (WAN), wired network, wireless network, etc.) that connects computing devices, e.g., host device 110 and attendee devices 120a-120d. Meeting server 130 may be used, for example, to mediate transactions between host device 110 and attendee devices 120a-120d. Server 130 may also perform caching or other time/bandwidth saving techniques. It should be understood that in a web-based conference system, each device may communicate with the server 130 through a browser application having one or more plug-ins that enable web-based meeting, and allow for the transmission of data to the meeting server 130, and the reception of data from the meeting server during a conference/meeting session.

Figure 1B:
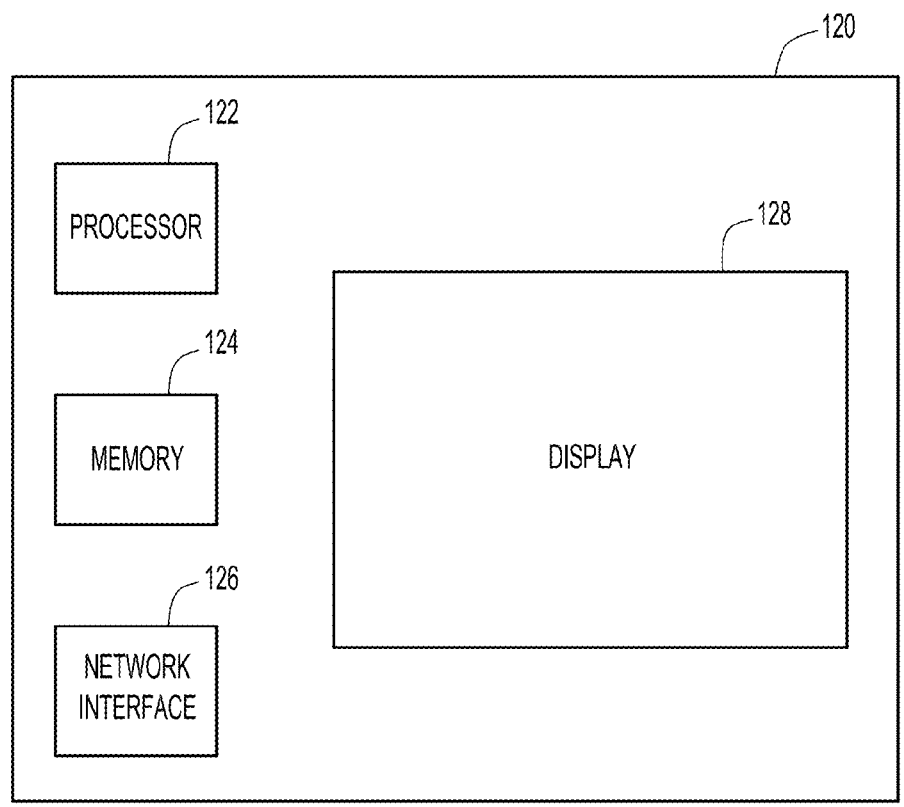
FIG. 1B is a block diagram of a user device capable of participating in the online conference session and invoking a full screen display mode as described herein.

Referring to FIG. 1B, a simplified block diagram of an example device, e.g., host device or attendee device is shown. For simplicity, FIG. 1B shows a block diagram of one of the attendee devices 120a-120d, generically referred or labeled with reference numeral 120. The device includes a processor 122 to process instructions relevant to a conference/meeting session supported by the system 100, memory 124 to store a variety of data and software instructions (e.g., display data for shared documents, applications, as well software instructions for a browser application to enable the connectivity and display of data during a conference session, etc.). The device also includes a network interface unit (e.g., card) 126 to communicate with other devices over network 140, and a display 128 to display the user interface (e.g., a desktop with windows) and other data associated with functions of the device as well as user interface items associated with the conference session (by way of a software for a browser application stored in memory 124). The attendee device may also include a user interface unit(s) in the form of a keyboard, mouse and/or a touchscreen user interface (integrated with display 128) to allow for a user of the attendee device to interface with the device. Memory 124 may comprise read only memory (ROM), random access memory (RAM), magnetic disk storage media devices, optical storage media devices, flash memory devices, electrical, optical, or other physical/tangible (e.g., non-transitory) memory storage devices. The processor 122 is, for example, a microprocessor or microcontroller that executes instructions for implementing the processes described herein. Thus, in general, the memory 124 may comprise one or more tangible (non-transitory) computer readable storage media (e.g., a memory device) encoded with software comprising computer executable instructions and when the software is executed (by the processor 122) it is operable to perform the operations described herein. While attendee device 120 and host device 110 will be described as different devices, they differ only in their respective roles in the conference session. In general, a user device that can be configured to be an attendee device 120 may also be configured to be a host device 110, at different times in the same or different conference sessions.

Figure 1C:
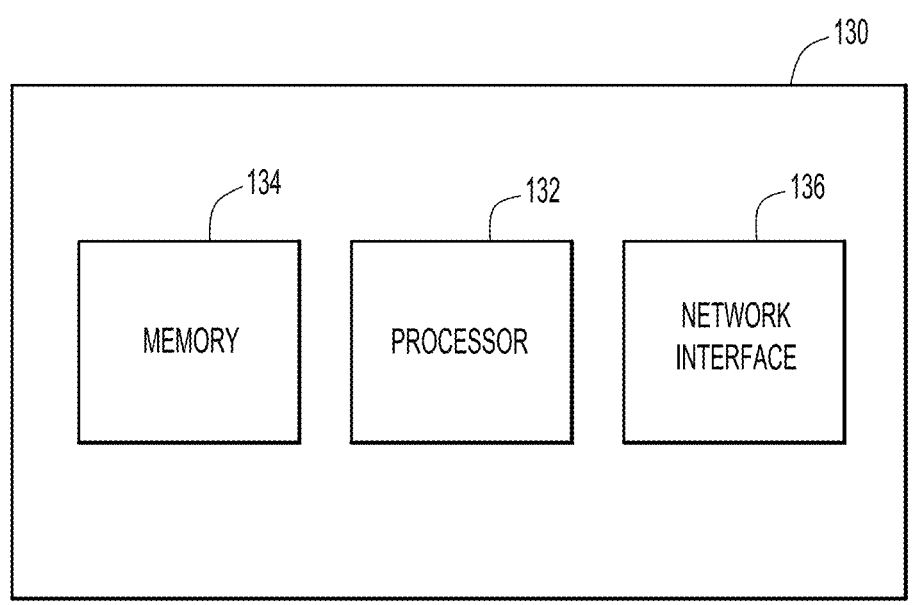
FIG. 1C is a block diagram of a meeting server capable of supporting the online conference session according to the techniques presented herein.

Referring now to FIG. 1C, a simplified block diagram of an example meeting server is shown. Meeting server 130 includes a processor 132 to process instructions relevant to a conference/meeting session supported by the system 100, memory 134 to store a variety of data and software instructions (e.g., display data for shared documents, applications, as well software instructions for a browser application to enable the connectivity and display of data during a conference session, etc.). The device also includes a network interface unit (e.g., card) 136 to communicate with other devices over network 140. Memory 134 may comprise read only memory (ROM), random access memory (RAM), magnetic disk storage media devices, optical storage media devices, flash memory devices, electrical, optical, or other physical/tangible (e.g., non-transitory) memory storage devices. The processor 132 is, for example, a microprocessor or microcontroller that executes instructions for implementing the processes described herein. Thus, in general, the memory 134 may comprise one or more tangible (non-transitory) computer readable storage media (e.g., a memory device) encoded with software comprising computer executable instructions and when the software is executed (by the processor 132) it is operable to perform the operations described herein.

Figure 2A:
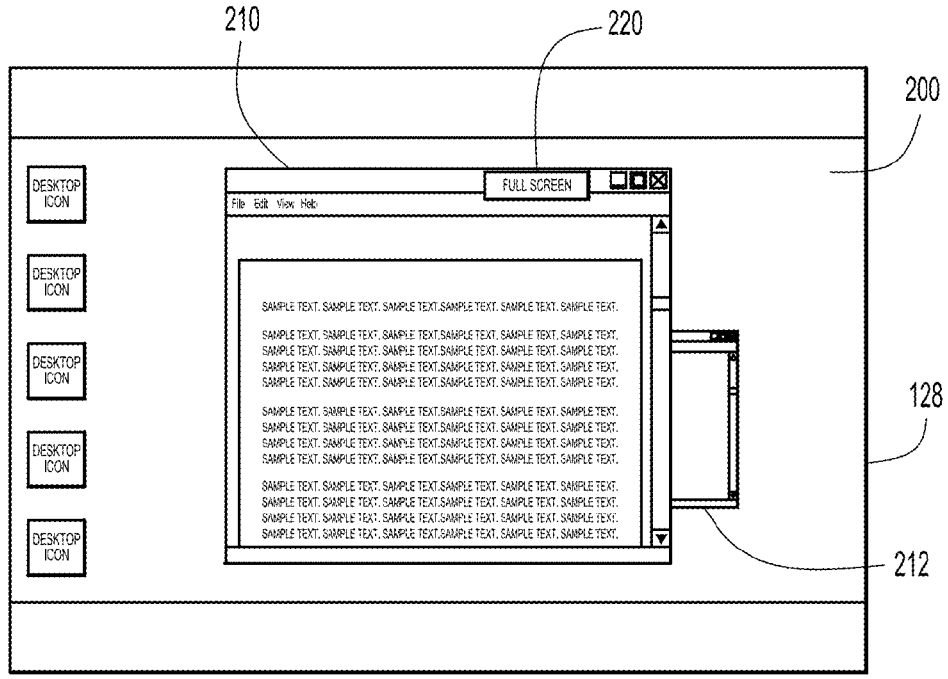
FIG. 2A is a simulated example screenshot of an attendee device displaying a desktop of a host device at a display resolution of the host device.
Figure 2B:
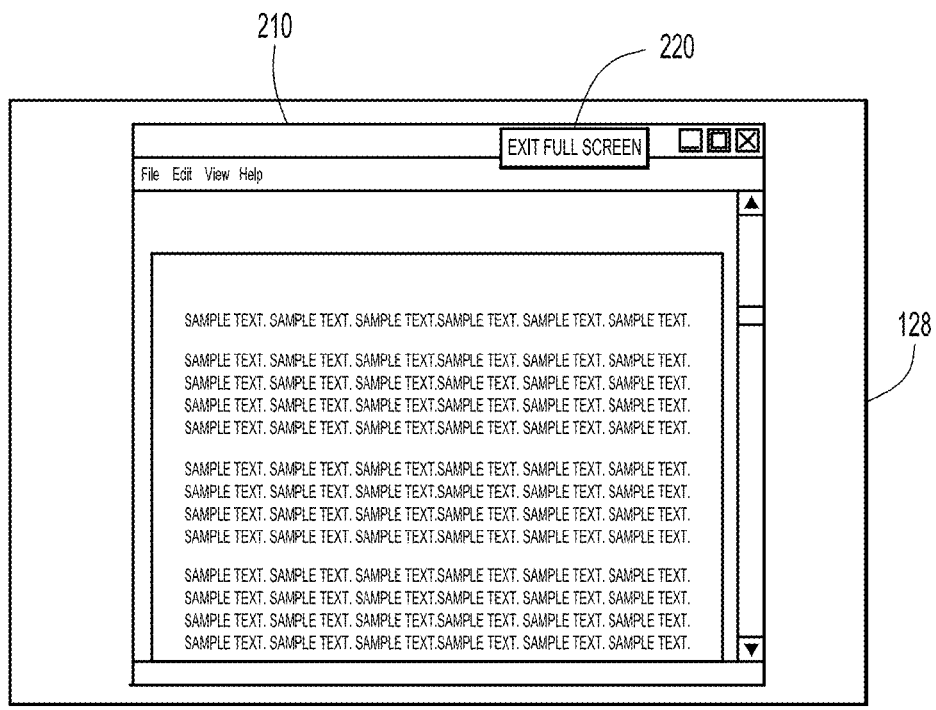
FIG. 2B is a simulated example screenshot of the attendee device displaying, in a full screen mode, an application window shared from the host device as shown in FIG. 2A.

Referring to FIGS. 2A and 2B, an attendee display is shown entering a full screen mode for a top application window. In FIG. 2A, display 128 shows a shared desktop 200 with shared application windows 210 and 212. Shared application window 210 includes graphical user element 220 configured to receive a command from a user, when selected or activated, to enter a full screen mode. FIG. 2B shows display 128 in full screen mode, showing only window 210 expanded to cover substantially all of the area of display 128. Graphical user element 220 may be used to exit full screen mode. In another example, the graphical user element used to exit full screen mode may be different (in appearance) from the graphical user element used to enter full screen mode.

In one example, the attendee selects to enter the full screen mode for a top application window. The top application window may change throughout a conference session, and an attendee device in full screen mode may change its display as the top application window changes. The top application window may be selected through a set of rules that determine the likelihood that a particular window within the overall display is the top window, and thus should be shared with attendee devices during a conference session. Some examples of these rules include: evaluating the visible region of the window (e.g., a larger visible region indicates a higher likelihood that the window is the top window and may want to be shared); evaluating the degree of activity in the window in a recent time period (e.g., a window that has been visible frequently in the past indicates a higher likelihood that the window is the top window); evaluating the interaction degree of the window (e.g., a window in which the host and/or attendee moves/clicks the mouse or uses keyboard actions frequently indicates a higher likelihood that the window is the top window); and detecting a specific request for a window (e.g., if the host and/or attendee device specifically requests content from a particular window, that window can immediately be designated as the top window). This selection process may run continuously to detect dynamic changes in the shared desktop. Alternatively, it may be triggered by a timer to detect changes periodically, while not necessarily running continuously.

Figure 3A:
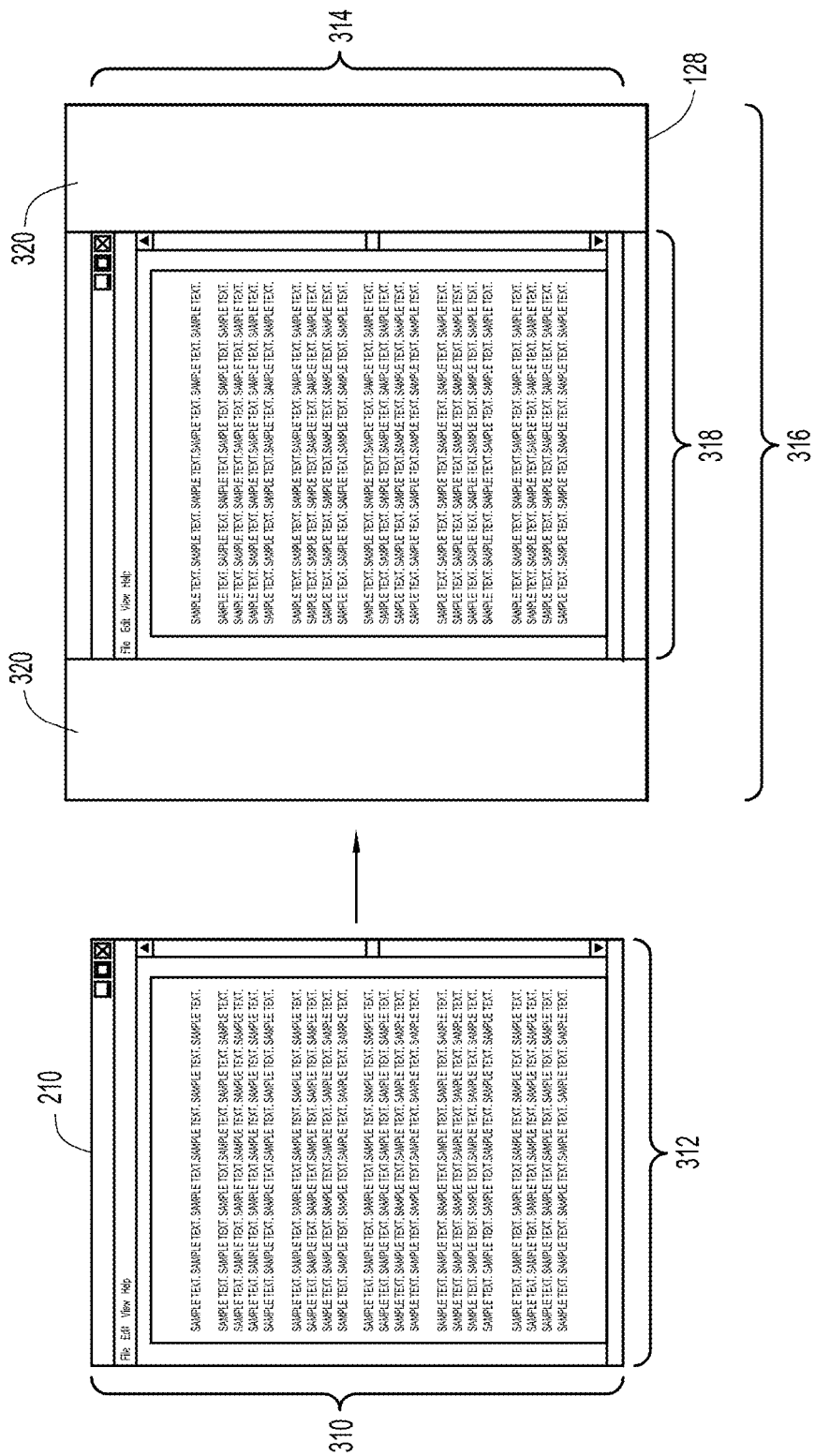
Figure 3B:
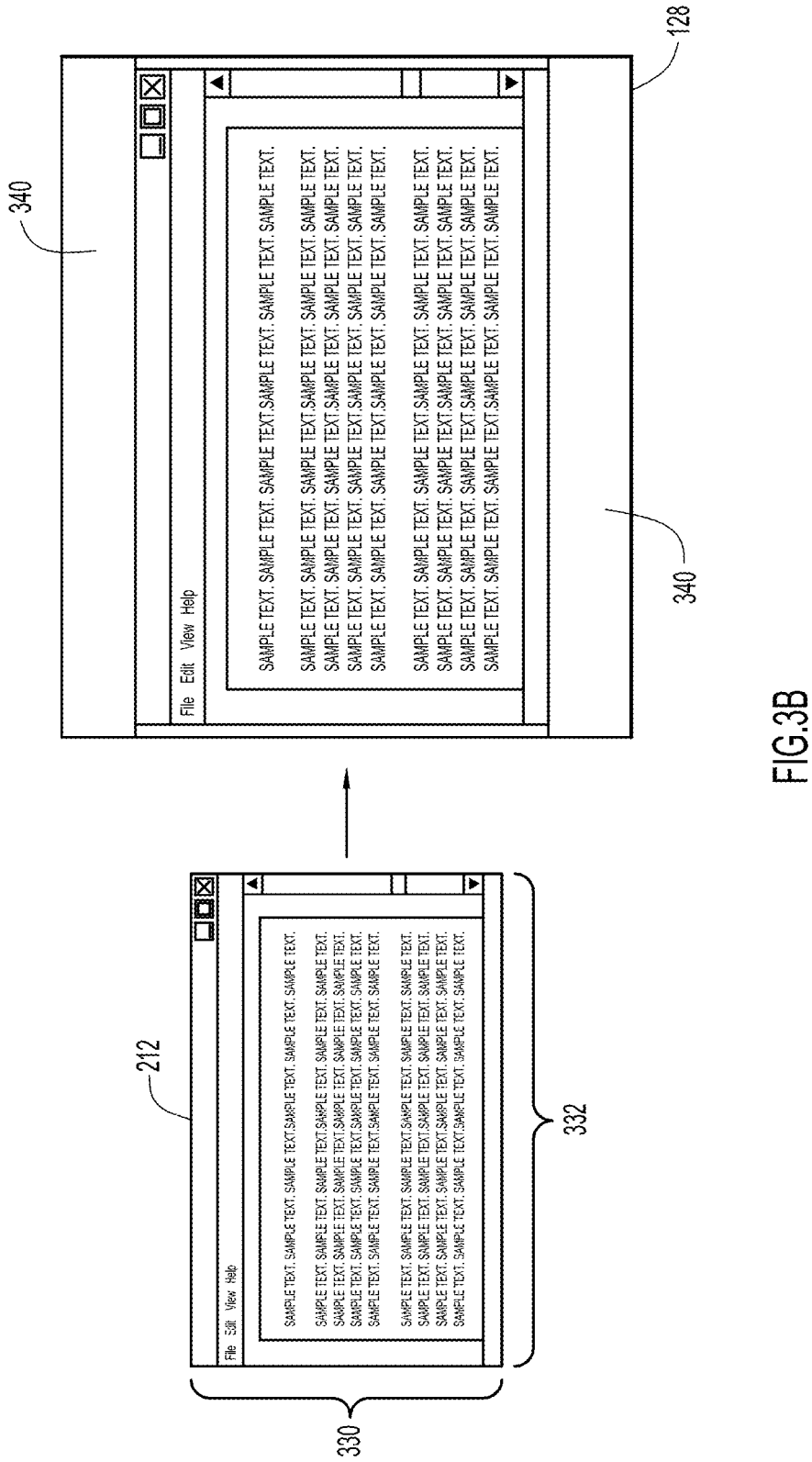

Referring to FIGS. 3A-3C, three examples of rendering application window 210 in full screen mode are shown. In FIG. 3A, window 210 has pixel height 312 and pixel width 310 when displayed at a first resolution. Display 128 has a pixel height 314 and a pixel width 316. When displayed in full screen mode at a second resolution, the magnified window has a pixel height equal to the pixel height 314 of the display 128, and a pixel width 318 that maintains the height to width ratio of window 210. Vertical bars or regions 320 are displayed on the sides of window 210 since the height-to-width ratio of window 210 is greater than the height-to-width ratio of display 128.

In one example, the resolution of the window 210 and/or display 128 is defined by their respective pixel regions. That is, the resolution $R_0$ of window 210 is calculated by multiplying pixel height 312 by pixel width 310. The resolution $R_m$ of the magnified window displayed in the full screen mode on display 128 shown in FIG. 3A is calculated by multiplying the pixel height 314 by the pixel width 318.

In FIG. 3B, window 212 has a smaller height 330 and larger width 332 when compared to the height 310 and width 312 of window 210 shown in FIG. 3A. When displayed in full screen mode, horizontal bars or regions 340 are displayed above and below window 212 since the height to width ratio of window 212 is less than the height to width ratio of display 128.

In FIG. 3C, window 210 has a height 310 and width 312 when displayed at the first resolution. In this example, the width of window 210 is stretched in full screen mode to display stretched window 350. Stretching the width of window 210 eliminates the need for black bars or regions on the sides of window 210 at the expense of some possible distortion of the displayed content. While this example demonstrates the width 312 of window 210 being stretched to match the width 316 of display 128, in other examples, the height may be the dimension that is stretched to match the display height.

Figure 4A:
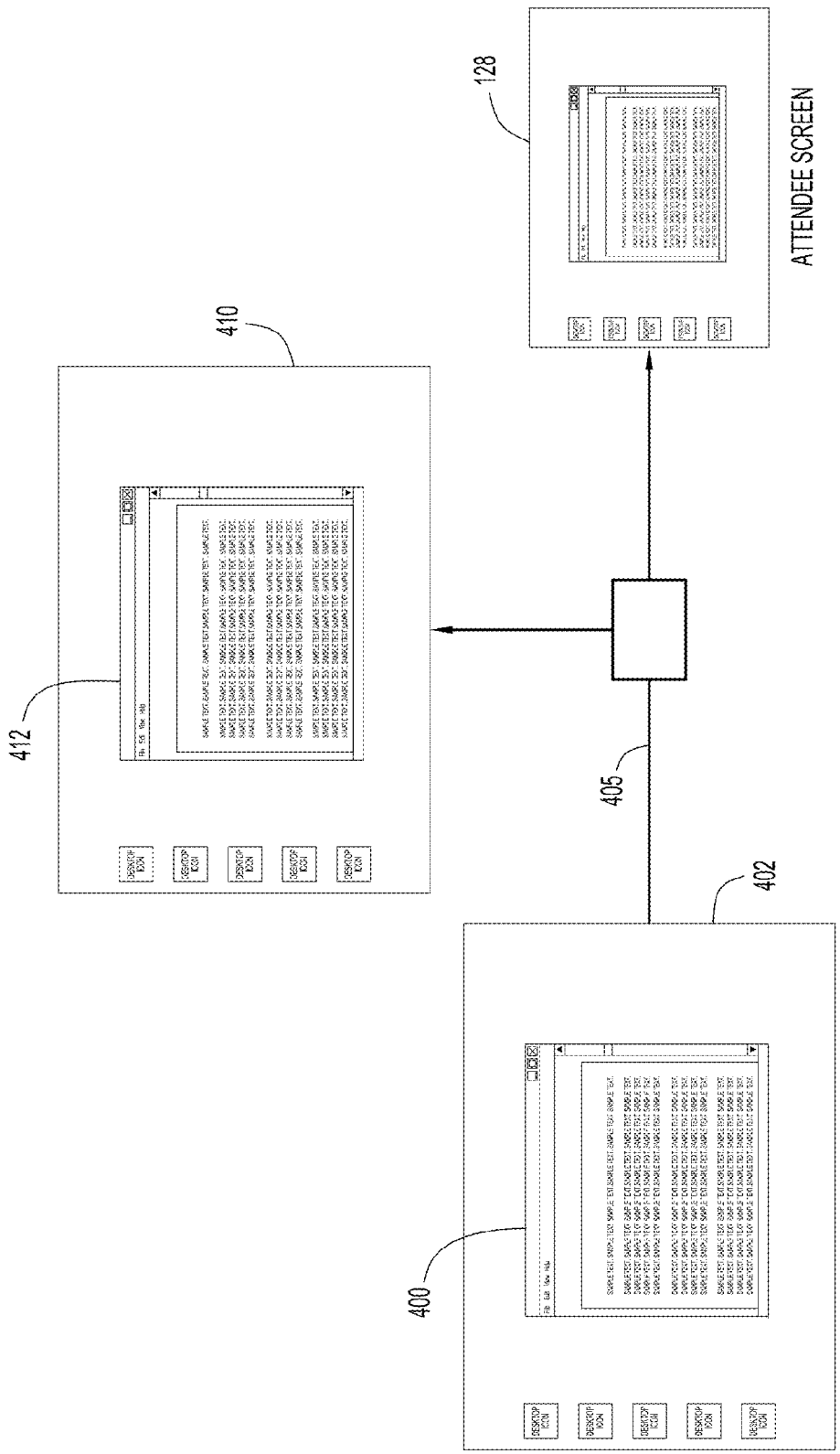
FIGS. 4A-4C show examples of the data that is transferred from the host device to the attendee device using different display modes on the attendee device.

Referring now to FIG. 4A, an example of the data shared between host device 110 and an attendee device 120 (e.g., any of the attendee devices 120*a*-120*d*) and displayed on their respective displays is shown. In this example, the host device displays window 400 in shared desktop 402 at a first resolution corresponding to the display on host device 110. Image data of desktop 402 is compressed and sent to server 130 as part of compressed data 405. Compressed data 405 may further comprise information relevant to the online conference session. The image portion of compressed data 405 is shown as image data 410, including the image 412 of window 400. Before entering full screen mode, attendee display 128 displays the shared window and the shared desktop at the same resolution as the host display in FIG. 4A.

Figure 4B:
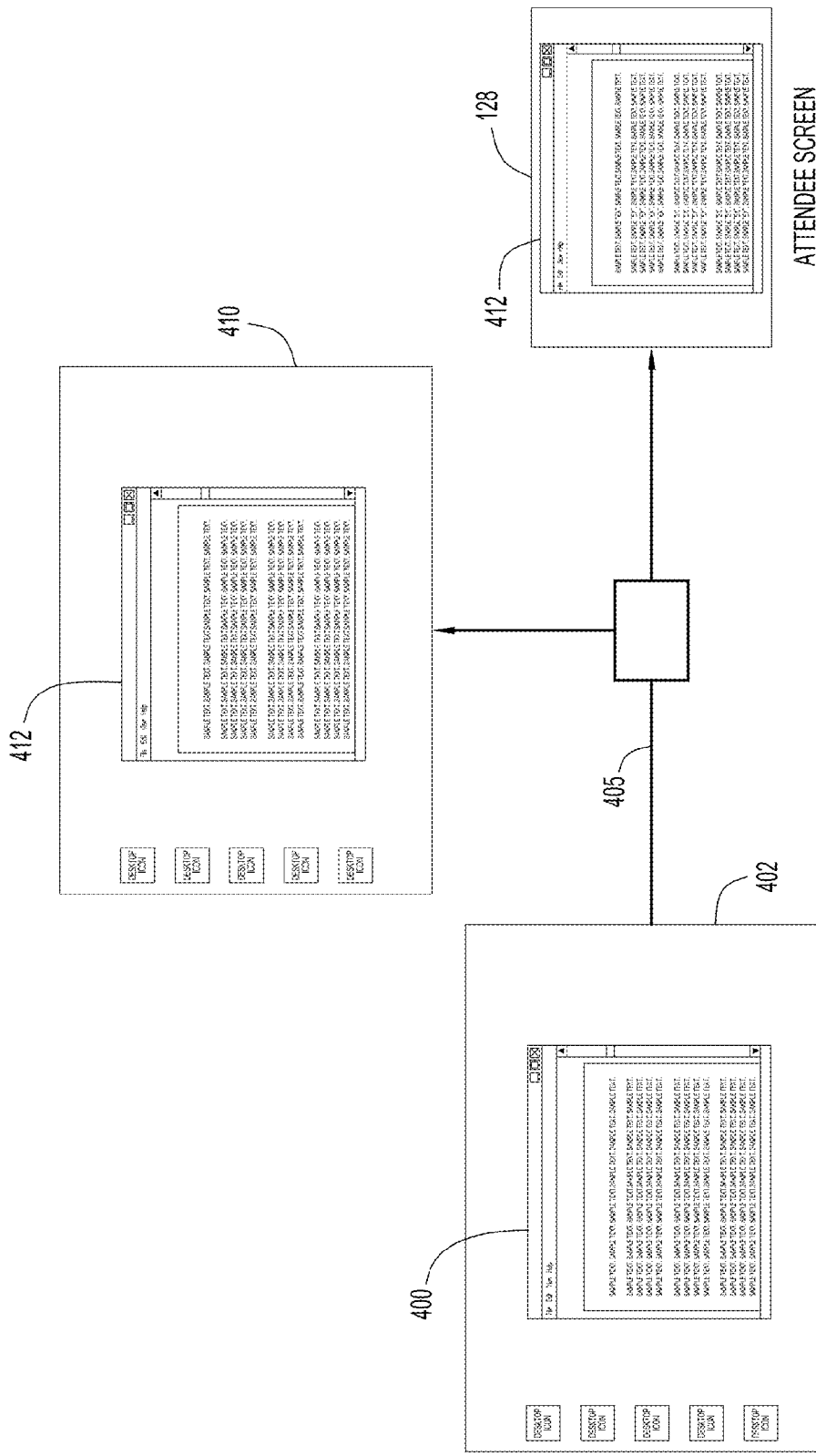

Referring now to FIG. 4B, an example of the content shared between host device 110 and attendee device 120 when attendee device 120 enters full screen mode is shown. In this example, the resolution of window 400 in the host device is the same (or larger) than the resolution of attendee display 128 in full screen mode. When the resolution of window 400 on the host display is the same or larger than the resolution of the full screen of attendee display 128, then image data 410 is sufficient to display the shared window without additional data from host device 110. In other words, when the image data 412 of window 400 contains at least as many pixels as attendee device 120 can display on display 128, then attendee device 120 can render image data 412 as accurately as possible on display 128. In an example in which the image data 412 contains more pixel data than display 128 can display, image data will be scaled down to fit on attendee display 128. The image data may be scaled down by the meeting server 130 or by the attendee device 120.

Figure 4C:
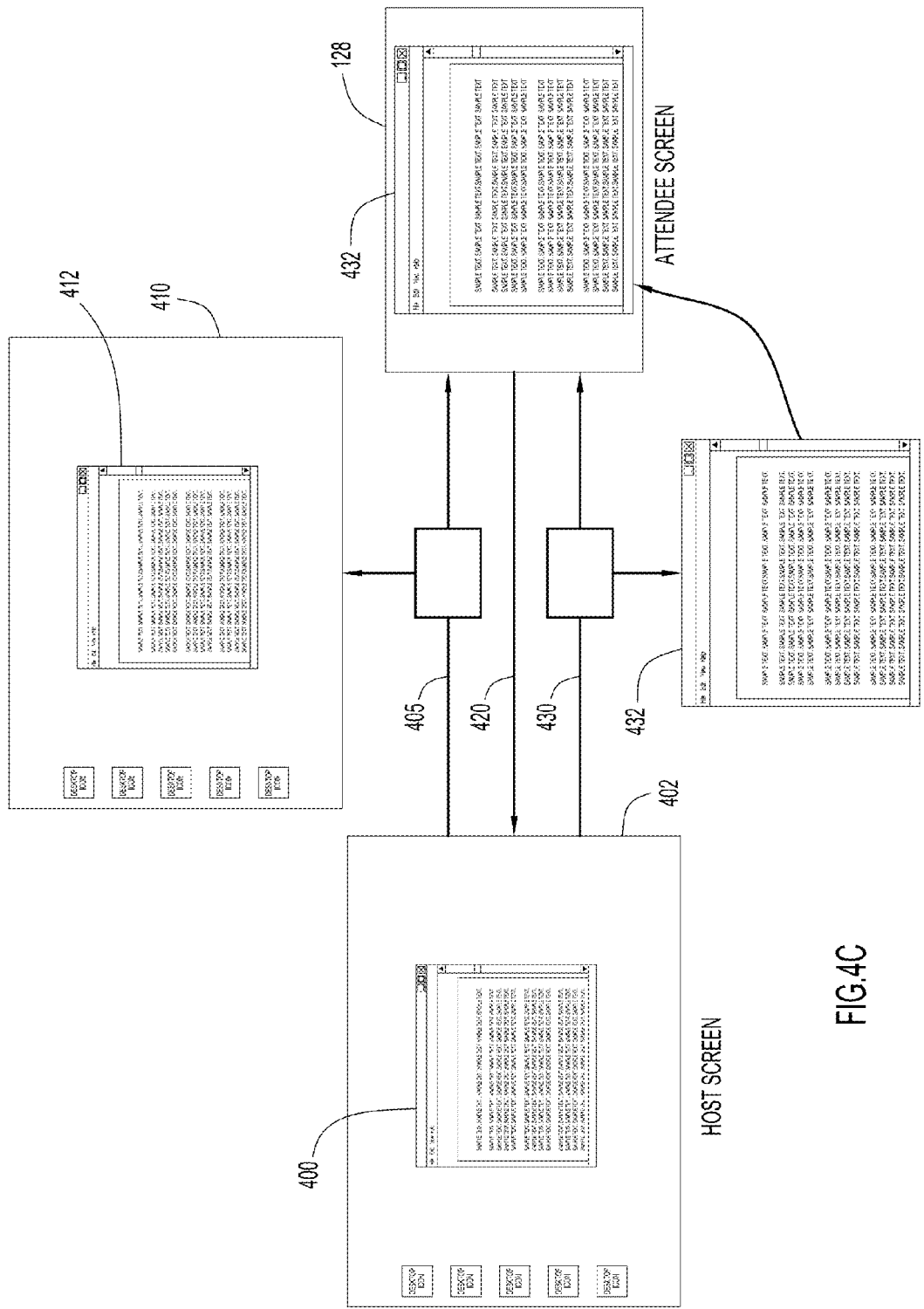

Referring now to FIG. 4C, an example of the data shared between host device 110 and attendee device 120 when display 128 is capable of displaying more pixels than that of image data 412. In this example, attendee device 120 sends a request 420 to host 120 for magnified image data of window 400. Host device 110 magnifies at least a portion of window 400 (e.g., through a built-in magnification function of the application), and returns compressed data 430 including magnified image data 432 to attendee device 120. By magnifying the window 400, host device is able to provide data for more pixels, and attendee device 120 is able to render the shared application window with a sharper picture. After an attendee device 120 has requested magnified image data, it no longer uses the original compressed data 405, and host device 110 (and/or the meeting server 130 on behalf of the host device 110) may cease transmitting compressed data 405 to attendee device 120.

Figure 5:
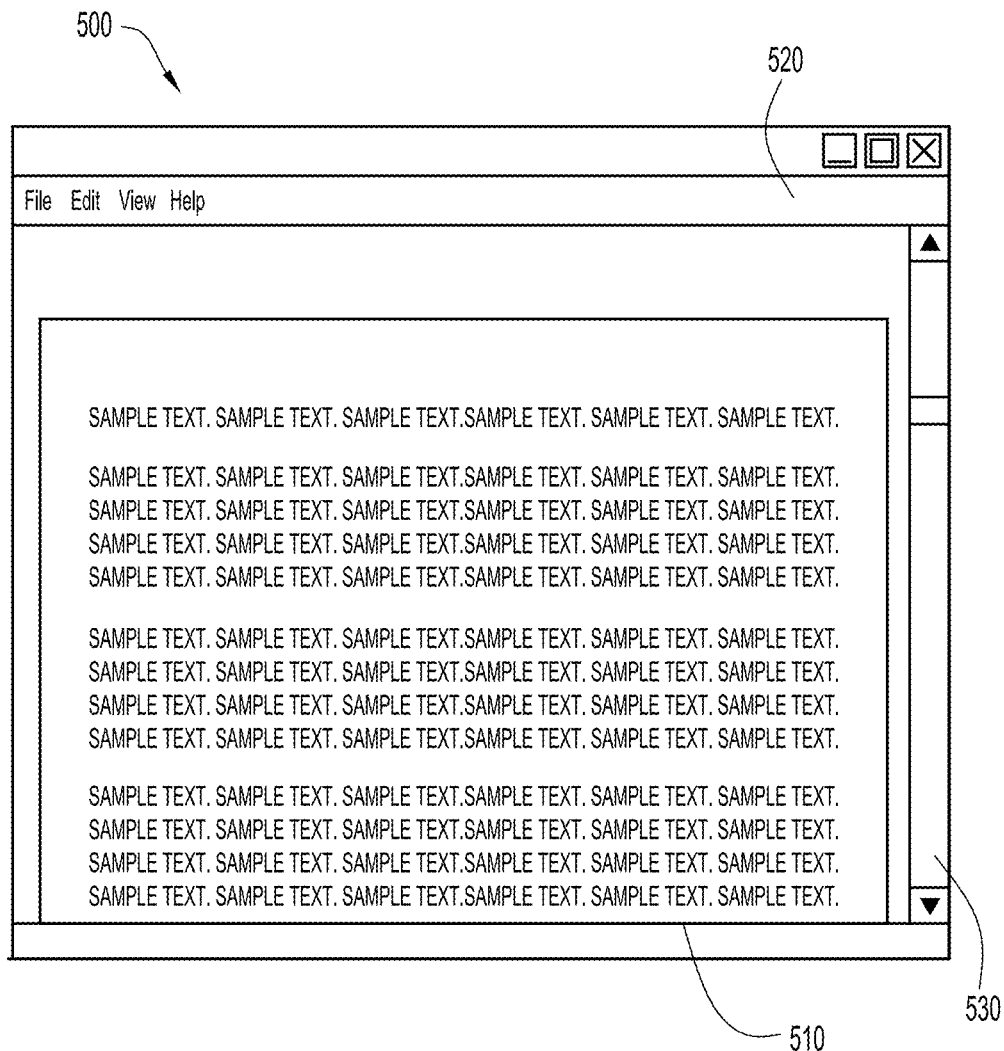
FIG. 5 is a simulated example screenshot of an application window showing portions that may be magnified according to the techniques presented herein.

Referring now to FIG. 5, an example window 500 is shown that may be magnified using for the techniques presented herein. In this example, window 500 includes content portion 510, menu bar 520, and scroll bar 530. Since some elements (e.g., menu bar 520 and/or scroll bar 530) of window 500 may not need, or even be able, to be magnified, host device 110 may only magnify portion 510 before capturing magnified image data to send, via the meeting server 130, to attendee device 120.

Figure 6:
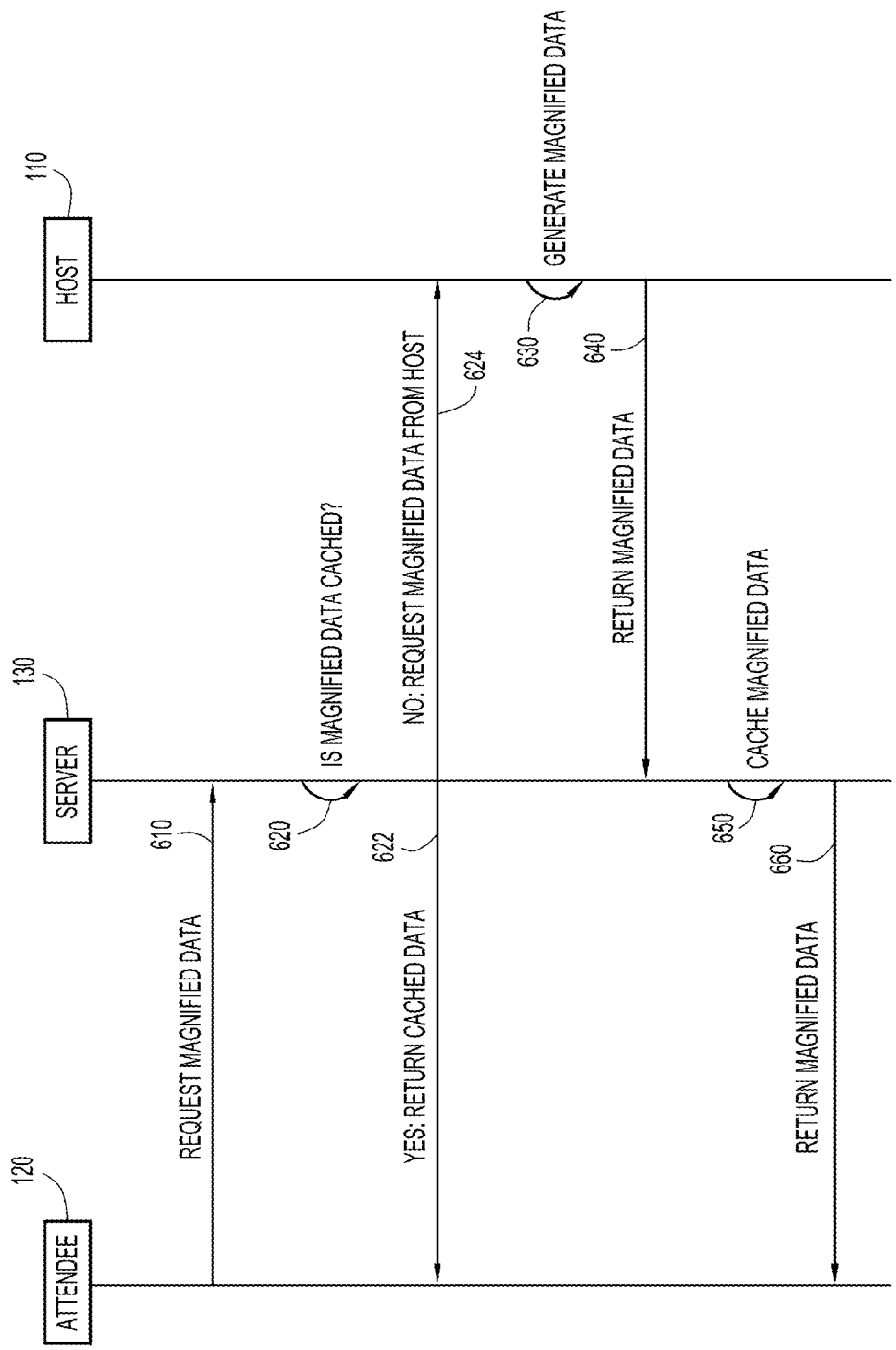
FIG. 6 is a sequence diagram illustrating one example of an attendee device requesting magnified image data to display a shared application window in full screen mode.

Referring now to FIG. 6, an example of a sequence or ladder diagram for attendee device 120 requesting magnified image data through meeting server 130 is shown. First, attendee device 120 transmits a request 610 to server 130 for magnified image data. Server 130 determines if the magnified data is cached at 620. If the magnified image data is cached, then server 130 returns the cached data at 622. If the magnified image data is not cached at the server 130, then server 130 transmits a request to host device 110 for magnified image data at 624. Host device 110 generates the magnified image data at 630, and returns the magnified image data at 640. Server 130 caches the magnified image data at 650, in the event other attendee devices will ask for the same magnified data. Server 130 forwards the magnified image data to attendee device 120 at 660, and attendee device 120 can now display the magnified image data in full screen mode.

Figure 7:
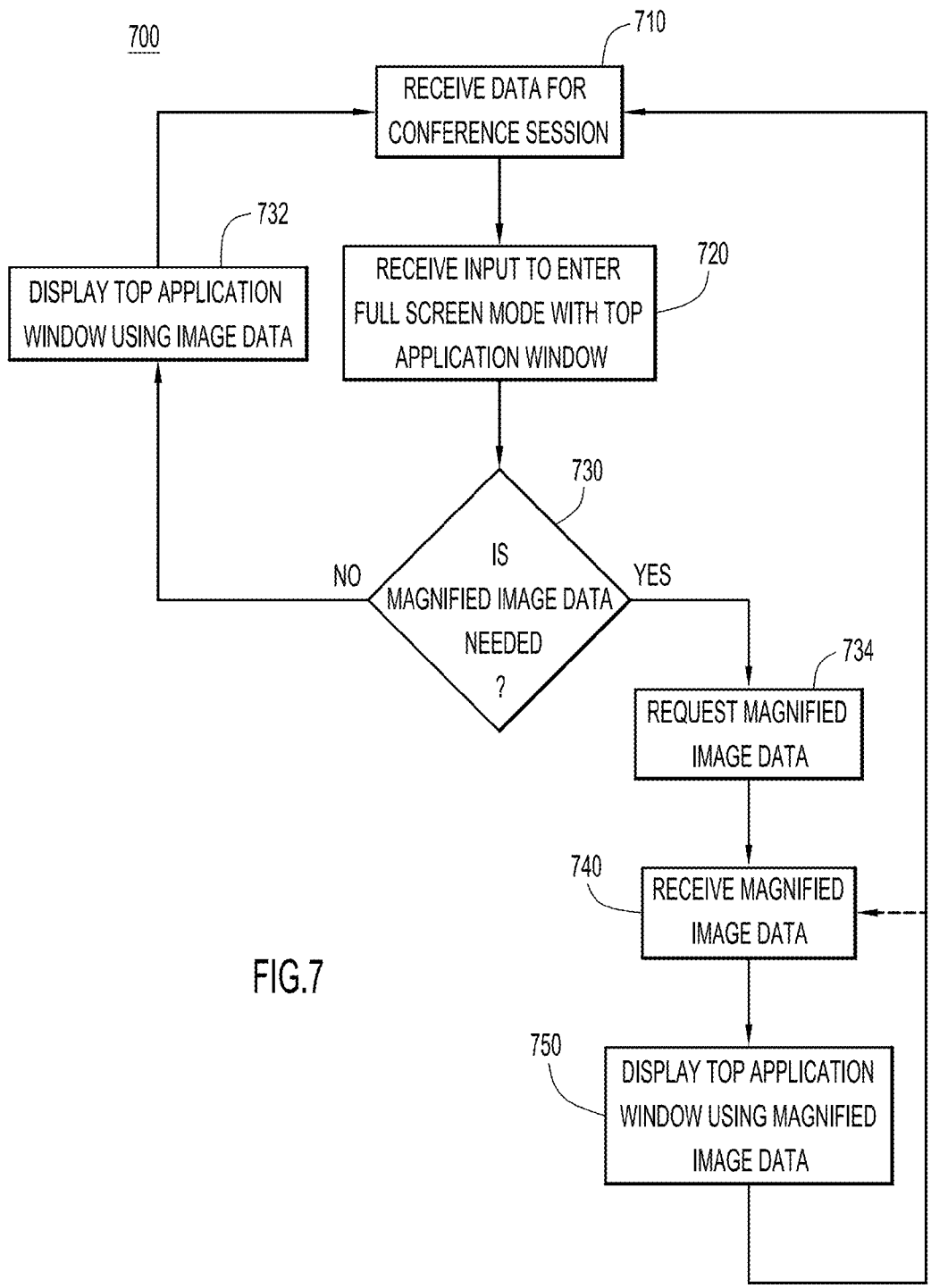
FIG. 7 is a flowchart showing one example of operations performed on an attendee device processing data to display an application window shared from a host device.

Referring now to FIG. 7, an example process 700 for an attendee device to request magnified image data is described. In step 710, attendee device 120 receives data for an online conference session from meeting server 130. When an attendee wants to enter full screen mode, he or she toggles full screen mode through a graphical user element that server 130 has inserted to the conference session data, such as that shown in FIGS. 2A and 2B. At step 720, attendee device 120 receives an input to enter full screen mode for a top application window. If attendee device 120 does not require magnified image data, as determined in step 730, then the attendee device displays, in step 732, the top application window using the data received in step 710. If attendee device 120 requires magnified image data, then attendee device 120 transmits, in step 734, a request to server 130 for magnified image data. In step 740, attendee device 120 receives the magnified image data, which is used to display the top application window in full screen at step 750. After attendee device 120 displays the top application window, either through the original image data at step 732 or through the magnified image data at step 750, then the process may return to step 710 to receive further data on for the conference session. Alternatively, once attendee device 120 has started receiving and displaying the magnified image data, it may continue to receive only the magnified image data until exiting the full screen mode. In this example, after step 750 the process returns to step 740 to receive more magnified image data.

Figure 8:
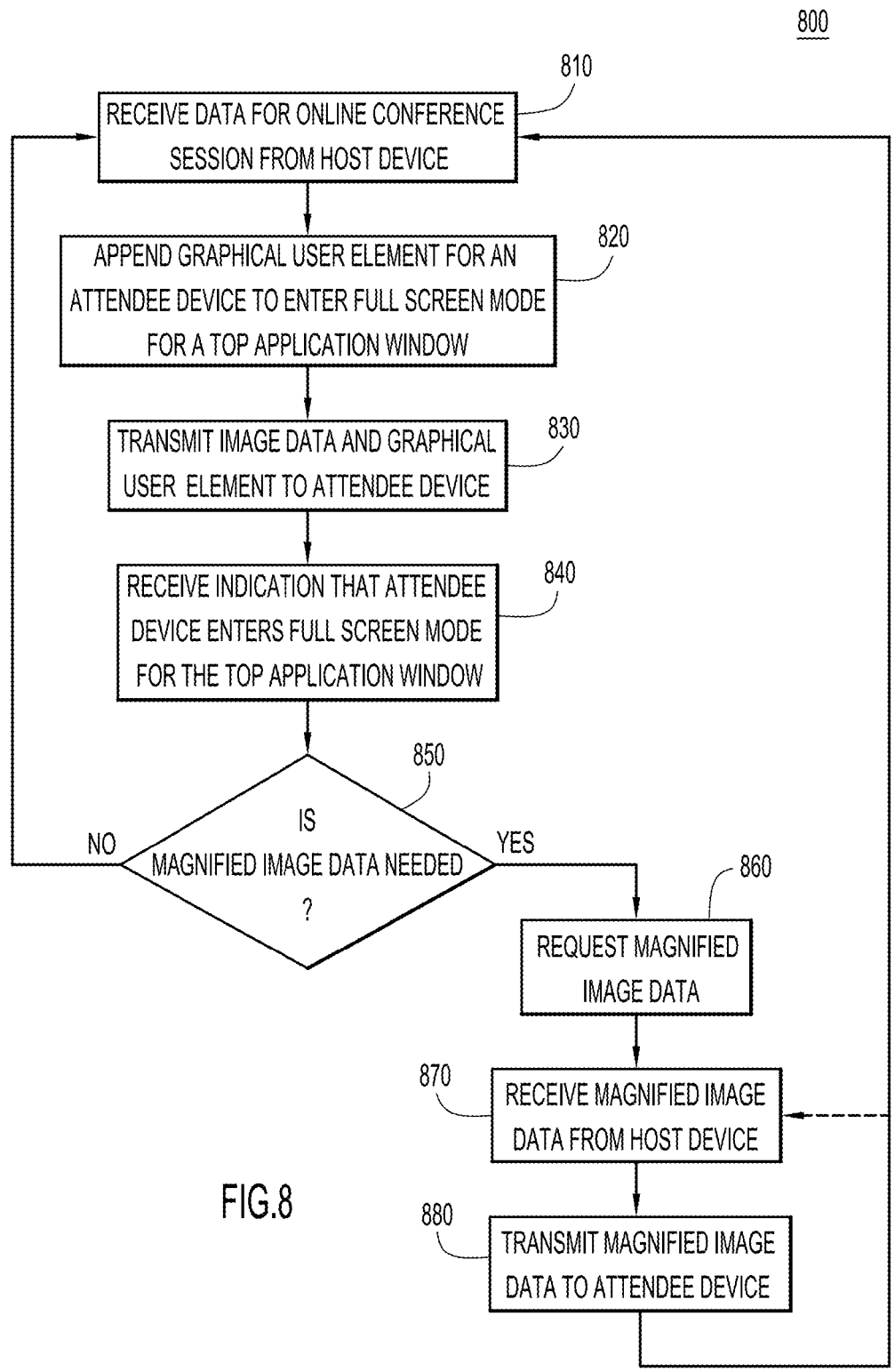
FIG. 8 is a flowchart showing one example of operations performed on a meeting server to facilitate an attendee device displaying an application window shared form a host device.

Referring now to FIG. 8, an example process 800 of meeting server 130 facilitating the conference session in accordance with the techniques presented herein is described. In step 810, meeting server 130 receives data for the online conference session from host device 110. Server 130 appends a graphical user element to the conference session data in step 820. The graphical user element is added to at least one application window in the conference session, and allows the attendee to enter a full screen mode for that application window. In one example, a graphical user element is added to each application window in a shared desktop, allowing the attendee device to display any of the application windows in full screen mode. Alternatively, the graphical user element may be added only to the top application window. In step 830, server 130 transmits the conference session data, including image data and the graphical user element, to attendee device 120.

In step 840, the meeting server 130 receives an indication that the attendee device 120 has entered full screen mode. In this example, server 130 has stored data indicating the size of display 128 on attendee device 120 and determines if magnified image data is required at step 850. This determination may be made, for example, by comparing the pixel height and/or width of the application window with the resolution of display 128. In an alternative example, attendee device 120 may make the determination and send the request for magnified data to the server 130. If magnified image data is not needed, as determined in step 850, then the process returns to step 810, where server 130 receives the next piece of data for the online conference session.

If magnified image data is needed, as determined in step 850, then the server 130 sends a request to host device 110, at step 860, for magnified image data. In step 870, server 130 receives the magnified image data from host device 110, and forwards the magnified image data to attendee device 120 in step 880. After transmitting the magnified image data to attendee device 120, the process may return to step 810 to receive regular data from host device 110 or it may return to step 870 and continue to receive magnified image data until the attendee device exits full screen mode.

In summary, the above examples describe a system and method for allowing an attendee to enter a full screen mode and view the details of the shared window more clearly. While in the full screen mode, the attendee device does not need to be concerned with where the host moves the top application window within the desktop. In some examples, the full screen mode will change the top application window without the attendee's input, improving the attendee's user experience.

Additionally, a method for an attendee device in an online conference session to enter a full screen mode is provided in which the attendee device receives data for content being shared by a host device in the online conference session. The data comprises image data for displaying at least one application window at a first resolution. The attendee device receives an input to enter a full screen mode for a top application window displayed on the attendee device. The attendee device receives the magnified image data from the host device, through the meeting server, and displays the top application window in the full screen mode.

Further, a method for a meeting server to facilitate the online conference session includes the meeting server receiving data for content being shared by a host device in the online conference session. The data includes image data for displaying at least one application window at a first resolution. The meeting server appends a graphical user element configured to receive an input to enter a full screen mode for a top application window and transmits the image data and graphical user element to an attendee device. The meeting server receives an indication from the attendee device that the attendee device is entering a full screen mode and displaying the top application window at a second resolution. The meeting server determines whether displaying the top application window at the second resolution requires the image data to be magnified. In the case that displaying the top application window at the second resolution does require the image data to be magnified, the meeting server transmits a request to the host device for magnified image data. Once the meeting server receives the magnified image data from the host device, it transmits the magnified image data to the attendee device, enabling the attendee device to display the top application window at the second resolution in the full screen mode.

Another example of scaling image data allows a host device to modify its display of a shared window based on the size that the window will appear on the attendee device display. This allows the host to ensure that the window is properly magnified for the attendees.

Figure 9:
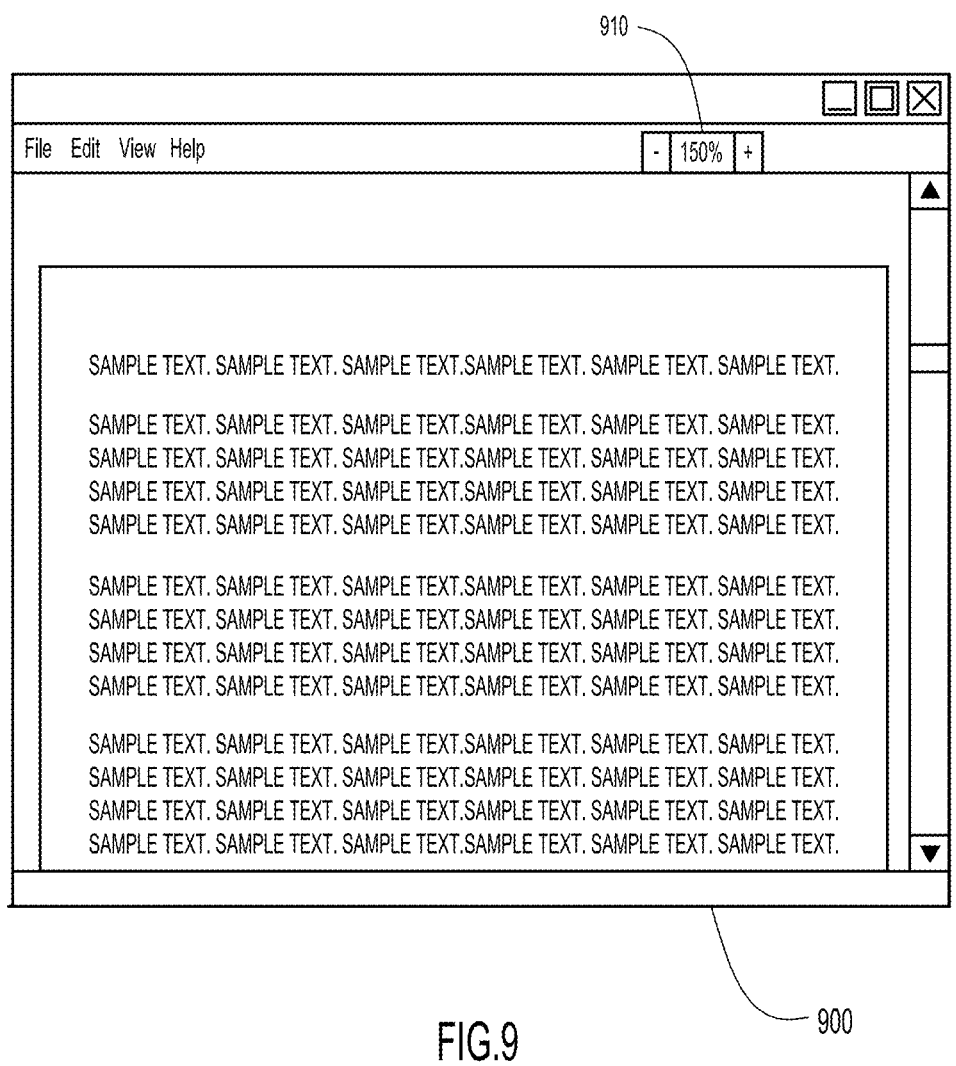
FIG. 9 is a simulated example screenshot of a shared application window including a magnification user interface element.

Referring now to FIG. 9, a shared window 900 is shown. Shared window 900 includes a graphical user element 910 that, when selected, causes the magnification of window 900 to be changed. Magnification element 910 allows host device 110 to change the size of shared window 900 so that it can transmit image data to attendee device 120 that are appropriately sized for the attendee device. A trigger mechanism causes the magnification element 910 to modify the top application window according to the techniques presented hereinafter. The trigger mechanism may be manual (e.g., the host or an attendee clicks on a button to invoke the magnification element), based on a percentage of the scheduled attendees joining the conference session, or based on one or more specified attendees join the conference session. Once the magnification element is triggered, it is displayed on the top application window, and the host device 110 calculates an appropriate magnification ratio to display the shared top application window.

In this example, the host device 110 calculates the size of the shared window in its display and compares it to the size of the window in the attendee device's display to determine an appropriate magnification value. For example, if the shared window is 1366 pixels wide and 768 pixels high on the host device's display, the resolution $R_h$ is 1366×768. If the shared window on the attendee device's display is 910 pixels wide and 512 pixels high, then the resolution $R_a$ is 910×512. Additionally, the dot pitch of the respective displays may be factored in with the resolution of the display to calculate a physical display region that accounts for the physical size of the displayed window. One example of the physical region of a shared window that factors in the dot pitch is given by the equation $R=W*H*D^2$, where $R_i$ is the physical display region of the device, W is the pixel width of the window, H is the pixel height of the window, and D is the dot pitch of the display. Hereinafter, the dot pitch will not be explicitly included in the examples, i.e., the resolution W*H will be used interchangeably with the physical display region, for simplicity, though it is to be understood that it may be used.

In order to ensure that the display on the attendee's device is sharp and not overly pixelated, the host device may calculate a magnification ratio such that the host provides image data to the attendee that is properly scaled to the attendee's display region. The magnification ratio may be calculated according to the formula:

$$M = \sqrt{\frac{R_h}{R_a}},$$

where M is the magnification ratio, $R_h$ is the resolution of the host device, and $R_a$ is the resolution of the attendee device. For the above example, where $R_h$ is 1366×768 and $R_a$ is 910×512, this formula leads to a magnification value M of 1.5, or 150%.

Figure 10A:
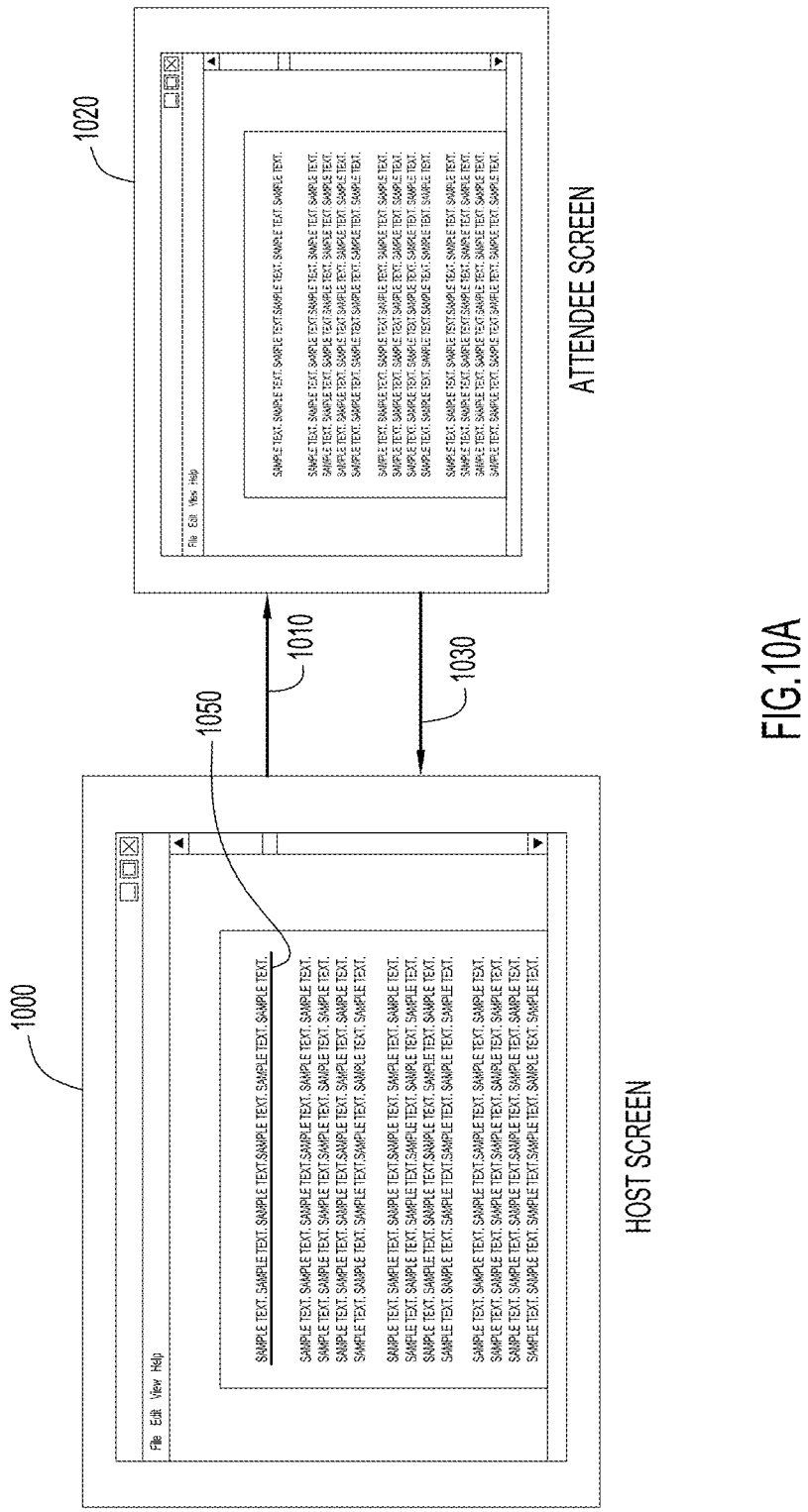
FIG. 10A shows a pair of simulated example screenshots depicting an attendee device and host device displaying a shared application window at the magnification of the host device.
Figure 10B:
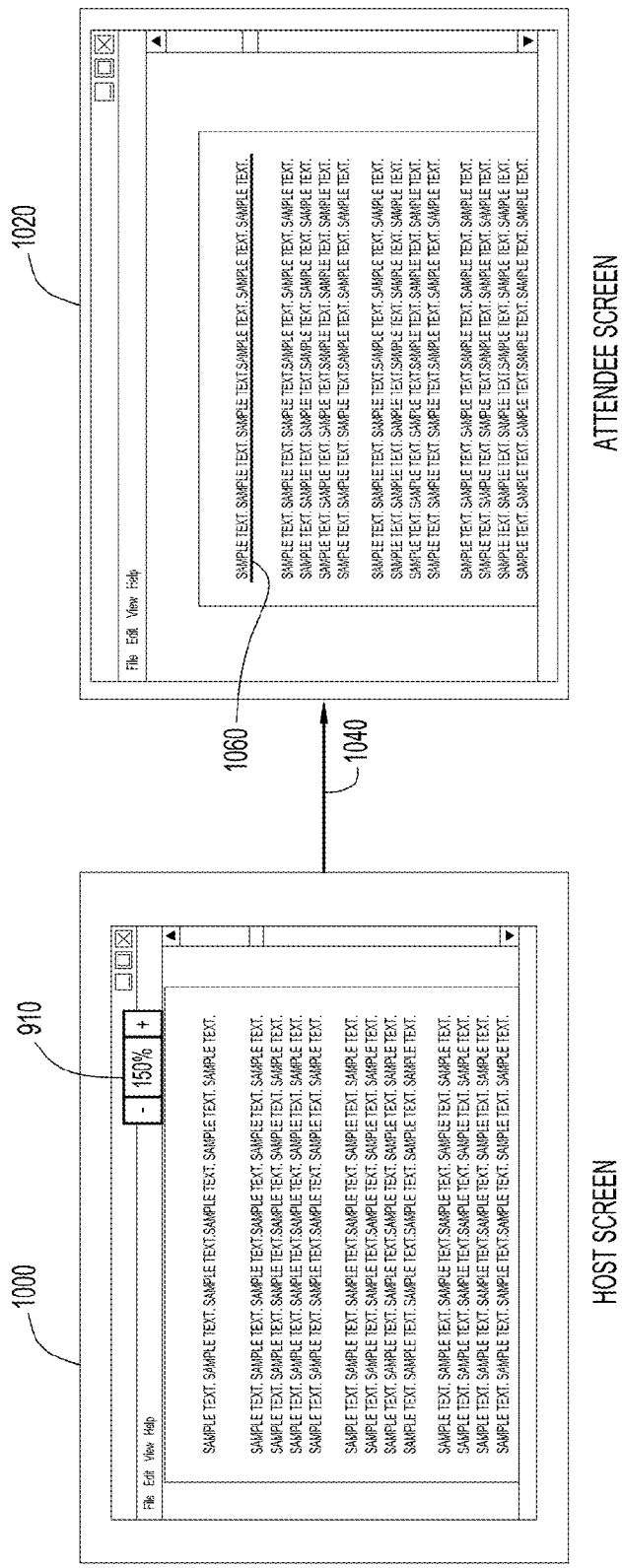
FIG. 10B shows a pair of simulated example screenshots depicting an attendee device and a host device displaying a shared application window at the magnification better suited for the smaller screen of the attendee device.

Referring now to FIGS. 10A and 10B, an example of a host device scaling a shared window for an attendee device is shown. Shared window 1000 is displayed in the host device at a size that the host deems appropriate and readable. Host device 110 sends image data 1010 to attendee device 120, and attendee device displays the shared window 1020. Attendee device also sends back the resolution of window 1020 in resolution data 1030. In response to the resolution data 1030, host device 110 invokes magnification element 910 and sets the magnification such to account for the resolution on the attendee device 120. Host device 110 captures magnified image data 1040 and transmits it to attendee device 120. In one example, the magnification element is set to a value such that the content 1050, displayed on host device 110 at a size that the host has deemed appropriate and readable, is substantially the same size as the content 1060 that is displayed on attendee device 120. It should be understood that in these figures, the host device 110 and attendee device 120 are communicating with the meeting server 130, and the meeting server 130 relays any communications as appropriate, or, when practical, performs one or more operations on behalf of the host device 110 or attendee device 120, as the case may be, based on data that the meeting server 130 has cached.

Figure 11:
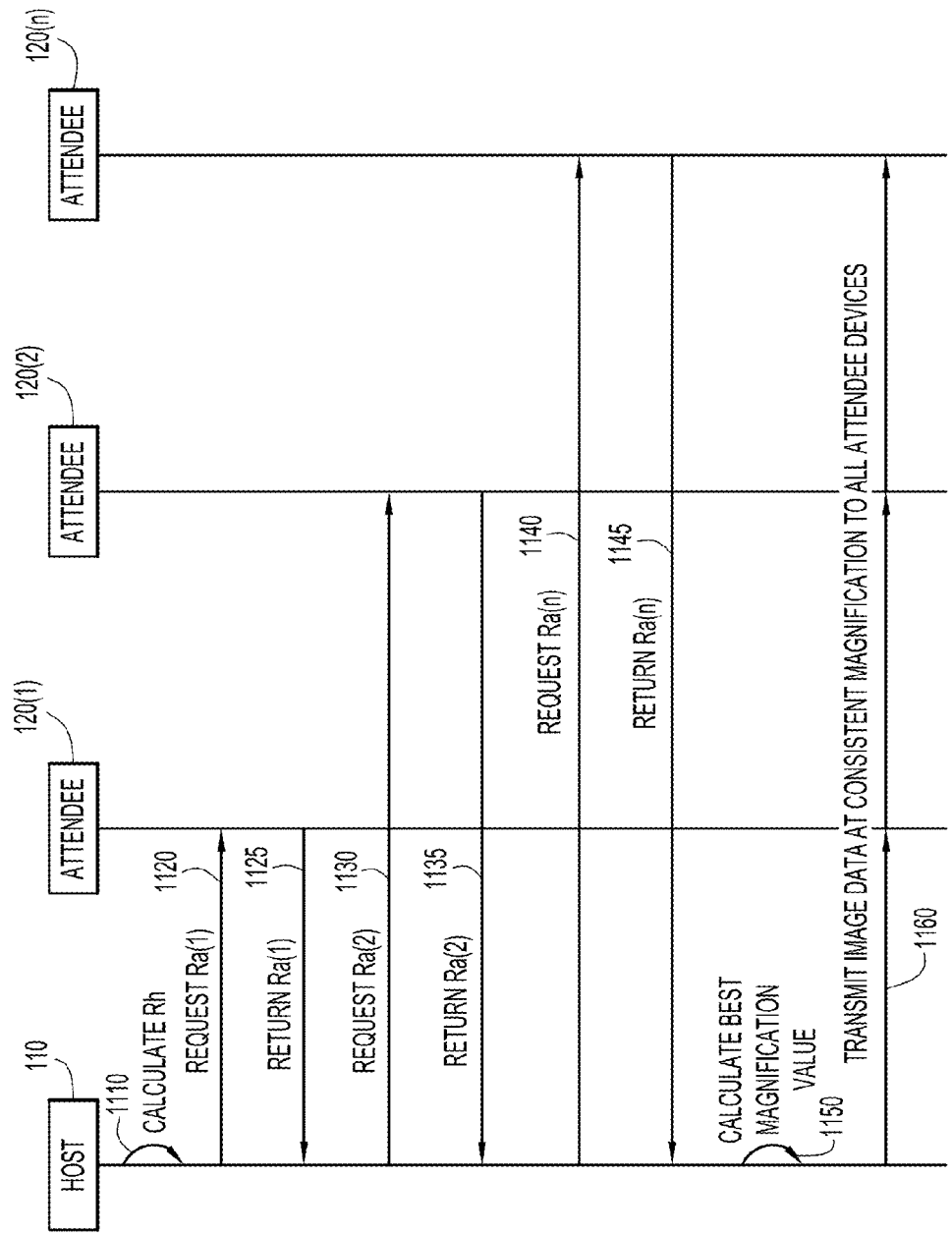
FIG. 11 is a sequence diagram of a host device collecting information representing screen sizes of the attendee devices and calculating an appropriate magnification for all of the attendee devices.

Referring now to FIG. 11, a sequence or ladder diagram for calculating an appropriate magnification value for a conference session with multiple attendee devices is shown. At 1110, host device 110 calculates the resolution $R_h$ of the shared window, and requests the resolution $R_a(1)$ from attendee 120(1) at 1120. Attendee 120(1) return its resolution $R_a(1)$ to host device 110 at 1125. Host device 110 requests the resolution $R_a(2)$ of attendee device 120(2) at 1130, which attendee device 120(2) returns at 1135. Host device 110 continues to poll the attendee devices until the last attendee device 120(n) is polled at 1140, and attendee device 120(n) returns its resolution $R_a(n)$ at 1145.

Once host device 110 has all of the required resolution values, it calculates the most appropriate magnification value to accommodate all of the attendee devices. In one example, host device 110 averages the resolution values for the attendee devices to calculate an appropriate magnification value at 1150. The average may be the arithmetic mean, median, or mode of the $R_a$ values. Once the appropriate magnification value is calculated, host device 110 sets the magnification of the shared window to the appropriate value and transmits image data, magnified by the magnification value, to each of the attendee devices 120(1)-120(n) at 1160.

In cases in which the application window has a native magnification function, the host may alter the original magnification to set the appropriate size of the content in the shared window as it appears on the host device 110. In these cases, the native magnification will be multiplied by the calculated magnification to generate the actual magnification. In other words, if the host decides that a document looks best on the host device when at a magnification of 120%, then the host will set the native magnification on the window to 120%. Host device 110 will then poll the attendee devices and calculate a magnification that is necessary to render the shared window at the same size on the attendee devices, as described above. For example, an attendee device such as a tablet computer may require a 150% larger window to be the same size as a host device displaying on a 24 inch monitor. In this case, host device 110 will magnify the content of the shared window by a total of 120%×150%=180% to ensure that the content of the shared window on the tablet computer is the same size as the content of the shared window that the host determined to be appropriate.

The magnification of the shared window may be manipulated through different means. In one example, an application programming interface (API) may provide a direct way to receive and change the magnification value. In another example, a mask window may be used to cover the shared window and manipulate the magnification value in a menu through the graphical user interface. In a further example, a single button or graphical user interface element on the shared window may trigger the host device 110 to calculate the appropriate magnification value and send the magnified image data to the attendee devices without specific changes visible to the host.

Figure 12:
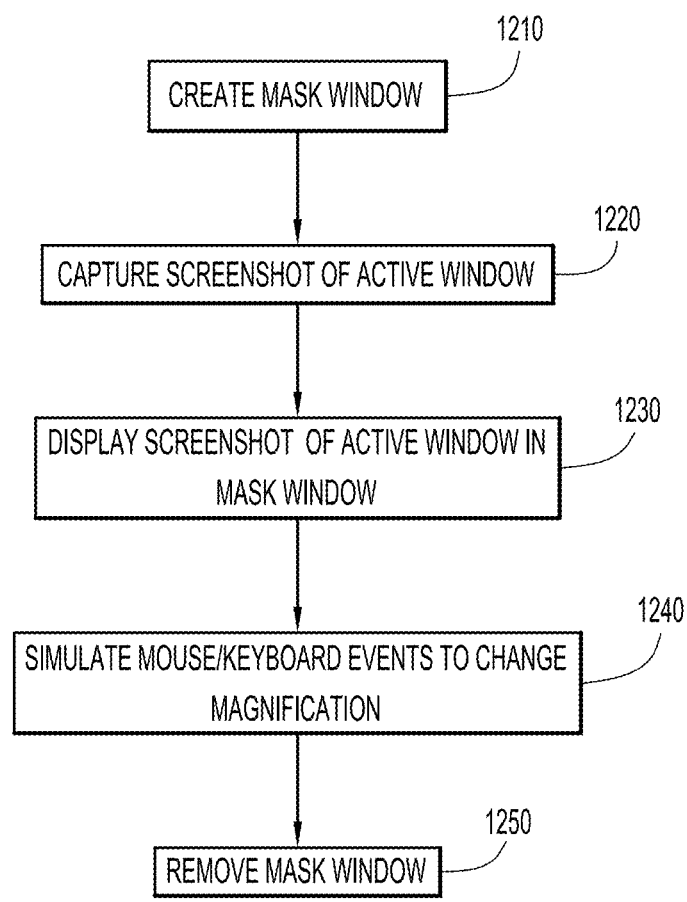
FIG. 12 is a flowchart showing one example of a process for using a mask window to hide the magnification processing from the user of the host device.

Referring now to FIG. 12, one example of how host device 110 manipulates a menu command to magnify the content of the window is shown. In step 1210, host device 110 creates a mask window over a shared window. Host device 110 creates a screenshot of the shared window at step 1220 and displays the screenshot in the mask window at step 1230. At this point the mask window hides the shared window, such that no changes related to rendering other page images are visible. In step 1240, host device 110 simulates keyboard and/or mouse events on standard user interface elements (e.g., menu button, scrollbar, etc.) to magnify the content of the shared window. After the appropriate magnification value has been entered, host device 110 may simulate mouse and/or keyboard events to remove any menus used to change the magnification value, such that the content is showing in the window. In step 1250, host device 110 removes the mask window so that the magnified shared window is visible. In one example, the mask window is not destroyed, but is made transparent and inactive (i.e., passing keyboard/mouse events through to the shared window).

Figure 13:
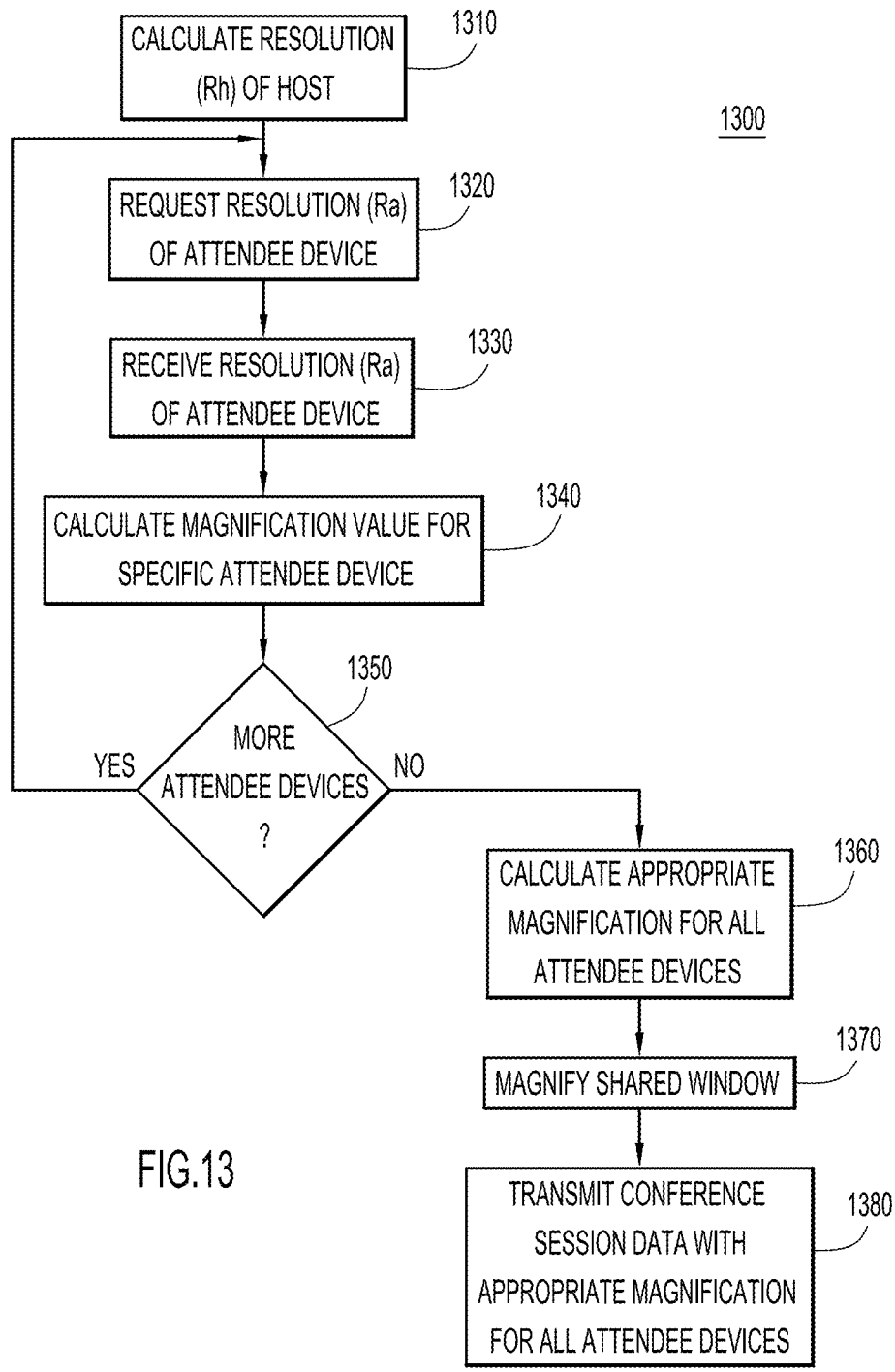
FIG. 13 is a flowchart showing one example of a process for calculating an appropriate magnification level for use in all attendee devices.

Referring now to FIG. 13, an example process 1300 for calculating the appropriate magnification value is shown. In step 1310, host device 110 calculates the resolution $R_h$ of the shared window in the host device. The host device requests the resolution $R_a$ of the shared window in a particular attendee device in step 1320. The attendee device returns the resolution $R_a$, where it is received by host device 110 at step 1330. In step 1340, host device 110 calculates the appropriate magnification value for that particular attendee device. If there are more attendee devices to be polled, as determined in step 1350, the process returns to step 1320 and host device 110 polls another attendee device.

Once all of the attendee devices are polled and host device 110 has calculated magnification values for each of the attendee devices, then host device 110 calculates an appropriate magnification value for all of the attendee devices (e.g., by averaging the individual magnification values) in step 1360. Once the final magnification value, appropriate for all of the attendee devices has been calculated, host device 110 magnifies the shared window by the final value in step 1370, and transmits the conference session data for the magnified shared window in step 1380.

While the foregoing description of FIG. 13 refers to the computations/operations performed at the host device, it should be understood that these operations may be performed by the meeting server based on data it receives from the host device (and from each of the attendee devices).

The above example shown in FIG. 13 is described for selecting an appropriate magnification value for all of the attendee devices. It is also envisioned that some attendees' user experience may be more important to the host than other attendees' experience. In this case, some of the magnification values may be weighted in the determination of the final magnification value that the host device uses. For example, in an online conference session for a board meeting with all of the members of a corporation's board participating, as well as several administrative staff, then the host may weight the user experience of the CEO with more priority than the user experience of the administrative staff. In another example, the resolution of devices with particularly small screens (e.g., smart phones) may be ignored when calculating the final magnification value to avoid skewing the user experience of other users with larger screens.

The foregoing example provides a mechanism to trigger a magnification bar and fill an appropriate magnification value for the attendees that the host selects. The final magnification value is calculated through a negotiation mechanism with the selected attendee devices.

The above description is intended by way of example only. Various modifications and structural changes may be made therein without departing from the scope of the concepts described herein and within the scope and range of equivalents of the claims.

What is claimed is:

1. A method comprising:
at a first attendee device participating in an online conference session with a host device and a plurality of second attendee devices:
receiving data for content being shared by and generated on the host device in the online conference session, the data comprising image data for displaying at least a top application window at a first resolution on a display on the first attendee device and a graphical user interface element configured to receive an input at the first attendee device to enter a full screen mode for at least the top application window;
receiving the input at the first attendee device to enter the full screen mode for the top application window displayed on the display on the first attendee device in connection with the online conference session, the full screen mode requiring the top application window to be displayed at a second resolution that is greater than the first resolution;
determining whether displaying the top application window at the second resolution for the full screen mode requires the image data to be magnified or scaled down based at least on a size of the display on the first attendee device;
responsive to the determination that displaying the top application window at the second resolution requires the image data to be magnified, transmitting a request to the meeting server for magnified image data associated with the top application window from the host device, and, in response, receiving, from the meeting server, magnified image data associated with the top application window generated on the host device, wherein the magnified image data is based on an average of the size of the display of the first attendee device and a size of a display of each of the plurality of second attendee devices;
responsive to determining that displaying the top application window at the second resolution requires the image data to be scaled down, receiving, from the meeting server, scaled down image data associated with the top application window such that the scaled down image data fits the display on the first attendee device; and
displaying the top application window on the display on the first attendee device in the full screen mode.

2. The method of claim 1, wherein determining whether displaying the top application window at the second resolution requires the image data to be magnified or scaled down comprises comparing a height and a width of the top application window at the first resolution to a full screen height and a full screen width of the first attendee device display.

3. The method of claim 1, further comprising transmitting an indication of the second resolution to the meeting server.

4. The method of claim 1, wherein the magnified image data from the host device comprises only a content portion of the top application window.

5. The method of claim 1, further comprising receiving an indication of a new top application window, and displaying the new top application window on the display on the first attendee device.

6. The method of claim 5, further comprising exiting the full screen mode in response to the indication of the new top application window.

7. The method of claim 5, wherein displaying the new top application window comprises displaying the new top application window in the full screen mode.

8. The method of claim 1, further comprising displaying the graphical user interface element configured to receive the input at the first attendee device to enter the full screen mode for the top application window.

9. A method comprising:
at a meeting server facilitating an online conference session between a host device and a plurality of attendee devices:
receiving data for content being shared by and generated on the host device in the online conference session, the data comprising image data for displaying at least a top application window at a first resolution;
appending, to the data, a graphical user element configured to receive an input to enter a full screen mode for the top application window;
transmitting to each of the plurality of attendee devices the data comprising the image data for displaying at least the top application window at a first resolution and the graphical user element configured to receive an input to enter a full screen mode;
receiving an indication from a first attendee device of the plurality of attendee devices using the graphical user element that the first attendee device is entering a full screen mode and displaying the top application window at a second resolution which is greater than the first resolution;
determining whether displaying the top application window at the second resolution requires the image data to be magnified or scaled down based at least on data stored on the meeting server indicating a size of a display on the first attendee device;
responsive to the determination that the image data needs to be magnified, transmitting a request to the host device for magnified image data associated with the top application window, and, in response, receiving, from the host device, the magnified image data associated with the top application window generated on the host device, the magnified image data being based on an average of a size of a display of each of the plurality of attendee devices;
responsive to determining that the image data needs to be scaled down, generate scaled down image data to fit on the displays of the plurality of attendee devices;
transmitting the magnified image data or the scaled down image data to the plurality of attendee devices, enabling the plurality of attendee devices to display the top application window at the second resolution in the full screen mode.

10. The method of claim 9, further comprising:
receiving from the host device an indication of a new top application window; and
in response to receiving the indication of the new top application window, sending to the plurality of attendee devices, the indication of the new top application window.

11. The method of claim 9, further comprising, after receiving the request for magnified image data of a top application window, stopping the transmission of the image data for displaying the at least one application window at the first resolution.

12. The method of claim 11, wherein the transmission of the image data for displaying the at least one application window is stopped after transmitting the magnified image data to the plurality of attendee devices.

13. The method of claim 9, further comprising receiving an indication of the second resolution used by the first attendee device in the full screen mode.

14. An apparatus comprising:
a network interface of a first attendee device configured to enable network communications, including communications with a meeting server that supports an online conference session with a host device and a plurality of second attendee devices;
a display of the first attendee device configured to display at least one application window shared in the online conference session; and
a processor configured to:
receive, on the first attendee device, data for content being shared by and generated on the host device in the online conference session, the data comprising image data for displaying at least a top application window running on the host device at a first resolution and a graphical user interface element configured to receive an input at the first attendee device to enter a full screen mode for the top application window;
receive an input to enter a full screen mode for a top application window displayed on the first attendee device in connection with the conference session, the full screen mode requiring the top application window to be displayed at a second resolution that is greater than the first resolution;
determine whether displaying the top application window at a second resolution for the full screen mode requires the image data to be magnified or scaled down based at least on a size of the display configured to display at least one application window;
responsive to the determination that displaying the top application window at the second resolution requires the image data to be magnified, transmit a request to the meeting server for magnified image data associated with the top application window from the host device, and, in response, receive, from the meeting server, magnified image data associated with the top application window generated on the host device, wherein the magnified image data is based on an average of the size of the display of the first attendee device and a size of a display of each of the plurality of second attendee devices;
responsive to determining that displaying the top application window at the second resolution requires the image data to be scaled down, receive scaled down image data from the meeting server, wherein the scaled down image data fits on the display configured to display at least one application window; and
display the top application window on the first attendee device in the full screen mode.

15. The apparatus of claim 14, wherein the processor is further configured to determine whether displaying the top application window at the second resolution requires the image data to be magnified by comparing a height and a width of the top application window at the first resolution to a full screen height and a full screen width of the display.

16. The apparatus of claim 14, wherein the processor is further configured to transmit an indication of the second resolution to the meeting server.

17. The apparatus of claim 14, wherein the processor is further configured to receive an indication of a new top application window, and display the new top application window on the display.

18. The apparatus of claim 17, wherein the processor is further configured to exit the full screen mode in response to the indication of the new top application window.

19. The apparatus of claim 17, wherein the processor is further configured to display the new top application window in the full screen mode.

20. The apparatus of claim 14, wherein the processor is further configured to display a graphical user interface element configured to receive the input to enter the full screen mode for the top application window.

21. An apparatus comprising:
a network interface configured to enable network communications, including communications related to an online conference session between a host device and a plurality of attendee devices;
a display configured to display at least one application window shared in the online conference session;
a processor configured to:
receive, on a meeting server facilitating an online conference session, data for content being generated on the host device in the online conference session, the data comprising image data for displaying at least a top application window running on the host device at a first resolution;
append, to the data, a graphical user element configured to receive an input to enter a full screen mode for a top application window;
transmit to the plurality of attendee devices the data comprising the image data for displaying at least one application window at a first resolution and the graphical user element configured to receive an input to enter a full screen mode;
receive an indication from a first attendee device of the plurality of attendee devices using the graphical user element that the first attendee device is entering a full screen mode and displaying the top application window at a second resolution which is greater than the first resolution;
determine whether displaying the top application window at the second resolution requires the image data to be magnified or scaled down based at least on data stored on the meeting server indicating a size of a display on the first attendee device;
responsive to the determination that the image data needs to be magnified, transmit a request to the host device for magnified image data, and, in response, receive, from the host device, the magnified image data associated with the top application window generated on the host device, the magnified image data being based on an average of a size of a display of each of the plurality of attendee devices;
responsive to determining that displaying the top application window at the second resolution requires the image data to be scaled down, generate scaled down image data to fit on the displays associated with the plurality of attendee devices; and
transmit the magnified image data or the scaled down image data to the plurality of attendee devices, enabling the plurality of attendee devices to display the top application window at the second resolution in the full screen mode.

22. The apparatus of claim 21, wherein the processor is further configured to:
   receive from the host device an indication of a new top application window; and
   in response to receiving the indication of the new top application window, send to the plurality of attendee devices an indication of the new top application window.

23. The apparatus of claim 21, wherein the processor is further configured to, after receiving the request for magnified image data of a top application window, stop the transmission of the image data for displaying the at least one application window at the first resolution.

24. The apparatus of claim 23, wherein the processor is further configured to stop the transmission of the image data for displaying the at least one application window after transmitting the magnified image data to plurality of attendee devices.

25. The apparatus of claim 21, wherein the processor is further configured to receive an indication of the second resolution used by the first attendee device in the full screen mode.

* * * * *